(12) United States Patent
Perttunen

(10) Patent No.: US 7,086,012 B1
(45) Date of Patent: Aug. 1, 2006

(54) REPRESENTATION OF WEIGHTED TREE-RELATED ELEMENTS

(76) Inventor: Cary D. Perttunen, 11764 Raintree Ct., Shelby Township, MI (US) 48315

(*) Notice: Subject to any disclaimer, the term of this patent is extended or adjusted under 35 U.S.C. 154(b) by 796 days.

(21) Appl. No.: 10/319,229

(22) Filed: Dec. 14, 2002

Related U.S. Application Data

(60) Provisional application No. 60/343,944, filed on Dec. 27, 2001.

(51) Int. Cl.
*G06F 3/048* (2006.01)
*G06F 19/00* (2006.01)

(52) U.S. Cl. ............... 715/853; 715/834; 715/855; 715/815; 715/841; 345/440; 345/440.2

(58) Field of Classification Search ........... 715/853, 715/854, 834, 855, 764, 815, 821, 841; 345/440, 345/440.2
See application file for complete search history.

(56) References Cited

U.S. PATENT DOCUMENTS

| | | | | |
|---|---|---|---|---|
| 5,590,250 A | * | 12/1996 | Lamping et al. | 715/853 |
| 5,619,632 A | * | 4/1997 | Lamping et al. | 715/853 |
| 5,926,180 A | | 7/1999 | Shimamura | 345/357 |
| 5,987,469 A | | 11/1999 | Lewis et al. | 707/102 |
| 6,285,367 B1 | | 9/2001 | Abrams et al. | 345/357 |
| 6,359,635 B1 | | 3/2002 | Perttunen | 715/834 |
| 6,509,898 B1 | | 1/2003 | Chi et al. | 345/440 |
| 6,583,794 B1 | | 6/2003 | Wattenberg | 715/708 |
| 2002/0054166 A1 | | 5/2002 | Decombe | 715/853 |
| 2002/0122072 A1 | | 9/2002 | Selker | 715/834 |
| 2002/0130907 A1 | * | 9/2002 | Chi et al. | 345/853 |
| 2002/0163517 A1 | * | 11/2002 | Loomis et al. | 345/440 |

OTHER PUBLICATIONS

"The best chart type for my data," help screen from Microsoft Excel for Windows 95, 1995.

* cited by examiner

*Primary Examiner*—Raymond J. Bayerl

(57) ABSTRACT

A corresponding value is determined for each non-root node in a tree-defined path between a root node and a particular non-root node based on a weight W of the corresponding non-root node, a cumulative weight C1 of all descendants of the corresponding non-root node, and a cumulative weight C2 of all descendants of a parent of the corresponding non-root node. A product of all values corresponding to non-root nodes in the tree-defined path between the root node and the particular non-root node is determined. A region having an angular width and a radial width each based on the product is provided to represent the particular non-root node.

20 Claims, 4 Drawing Sheets

REPRESENTATION OF WEIGHTED TREE-RELATED ELEMENTS

CROSS-REFERENCE TO RELATED APPLICATION

This application claims priority to and the benefit of U.S. Provisional Application No. 60/343,944, filed Dec. 27, 2001, which is hereby incorporated by reference into the present application.

BACKGROUND OF THE INVENTION

1. Field of the Invention

The present invention relates to methods and systems for representing a tree.

2. Description of the Related Art

Graphs are commonly visually represented by dots corresponding to nodes of the graph, and lines corresponding to edges of the graph. An alternative method and apparatus for displaying a graph is disclosed in U.S. Pat. No. 6,285,367 B1 to Abrams et al. Abrams et al. discloses displaying a graph using a set of successive outer portions of a geometrical shape, such as successive concentric circles. An inner-most portion is identified with some node or data item. Successive outer portions, which may be partitioned into sectors, are displayed to indicate a relationship to the inner-most node. Each outer portion is related to an adjacent inner portion or sector by the graph.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE PREFERRED EMBODIMENTS

Figure 1:
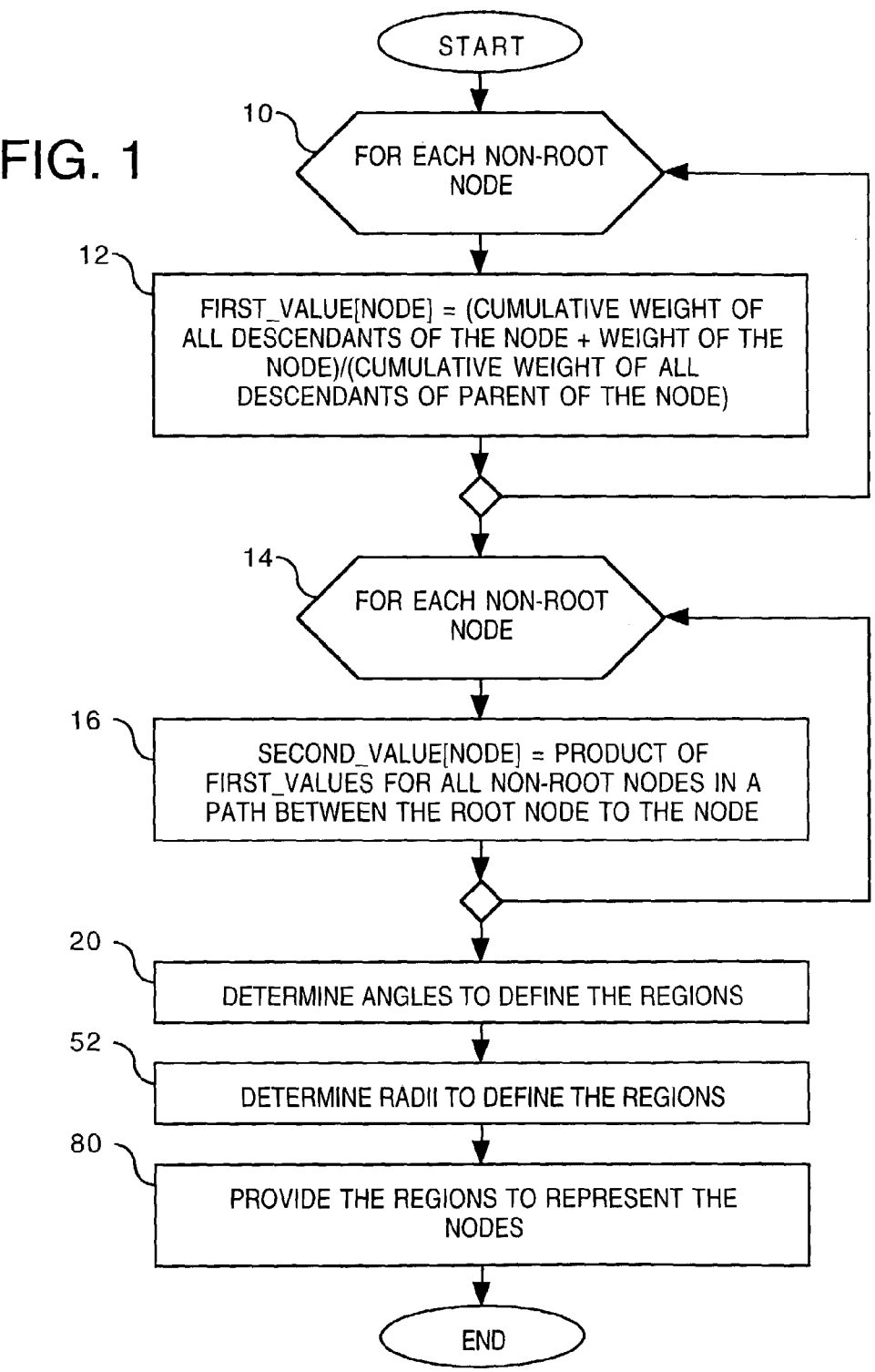
FIG. 1 is a flow chart of an embodiment of a method of determining regions to represent tree-related elements.

Disclosed herein are improved methods of determining parameters which define regions representing tree-related elements. Each region has a controlled area based upon a predetermined value, herein referred to as a weight, associated with the element. Preferably, each region has an area monotonically related, and more preferably proportional, to its weight. For example, consider a first region representing a first element with a first value, and a second region representing a second element with a second value. If the first value is greater than the second value, the first region has a first area greater than a second area of the second region.

The weight values need not be determined for cases in which each of the nodes either is unweighted or has the same weight value. In these cases, the hereinafter-described computations can be simplified by assigning a weight of one to each of the nodes. A plurality of regions, each having the same area, results in these cases.

The regions may be visibly displayed to provide a visible representation of the tree, and/or used to provide an input interface to allow a user-initiated selection of a portion of the tree. Optionally, the regions may be printed to produce a hard copy representation of the tree.

Examples of the tree-related elements are numerous. Examples of each of the elements, include but are not limited to a physical object, a purchasable item, a computer address, a computer site, a Web page, audio content, an image, computer software, an information category, an information subcategory, an information source, a logical disk for a computer, a computer directory, a computer-readable file, computer-readable data, a computer-readable message, a general category, a general subcategory, a patent claim, a node of a graph, a node of a tree, a leaf node of a tree, an individual, a job position, a state in a problem-solving process and non-geographical elements.

Examples of weight values associated with any herein-mentioned element include, but are not limited to, a price of the element, a similarity value of the element with a search expression, a size of the element, and other properties of the element. More specific examples of interest include, but are not limited to, a price of a purchasable item, a similarity value of a computer-readable file with a search expression, a similarity value of a purchasable item with a search expression, a size of a computer-readable file, and a size of a computer directory.

Before proceeding, a review of graph-related terminology is provided. A graph is definable by a set of nodes and a set of edges joining or associating different pairs of distinct nodes. The edges in the graph may be either directed or undirected. It is noted that alternative terminology may be used to describe the graph. Examples of synonyms of "node" include, but are not limited to, "vertex" and "state". Examples of synonyms of "edge" include, but are not limited to, the terms "arc" and "link". Therefore, the herein-disclosed methods, articles, apparatus, and examples should not be limited by the selected terminology used to describe the graph.

Each element is represented by a corresponding node of the graph. Relationships between elements are represented by edges in the graph. Examples of edge-represented relationships are numerous. Examples of relationships between elements include, but are not limited to, a degree of similarity, a hyperlink, an associative link, a state of being an element of, a state of being contained in, a state of being associated with, a state of reporting to, a state of being in a category, a state of depending from, a state of being a reply to, and a step in a problem-solving process.

A first node is said to be adjacent to a second node if there is an edge from the first node to the second node. A path is definable by a sequence of nodes wherein each consecutive pair of nodes in the sequence is adjacent.

A tree is a graph having a unique path from a designated node, called a root node, to each of its other nodes. If the tree is undirected, then any of its nodes can be designated to be the root node. An undirected tree can be made into a directed tree by directing all edges away from the designated root node.

Each node in a directed tree, except for the root node, is a child node of a unique parent node from which an edge is directed thereto. Nodes having the same parent node are called siblings. Nodes of a directed tree with no children are called leaf nodes. Nodes having at least one child are called internal nodes.

A level number of a node is defined as the number of edges in the path between the node and the root node. The height of the tree is the largest level number of any node.

Optionally, the tree which relates the elements is generated from a graph by removing one or more nodes and/or one or more edges. If the graph is a tree, this act need not be performed. However, if desired, the tree may be a subtree of a second tree. In general, the tree is a subgraph of the graph if this act is performed.

As those having ordinary skill will recognize, various computer-readable data structures can be used to represent the tree in a computer-readable form using a computer-readable medium.

Each non-root element in the tree is represented by a corresponding concave region such as an annulus sector. In describing shapes in this patent application, the term "annulus sector" is meant to be synonymous with "sector of an annulus". As such, an approximately circular annulus sector is meant to describe an approximate sector of a circular annulus. An approximately circular annulus sector is definable by a first line segment, a second line segment, a first approximately circular arc, and a second approximately circular arc. The first approximately circular arc is at least partially definable by a first focus point and a first radius. The second approximately circular arc is at least partially definable by a second focus point and a second radius. Preferably, the first focus point and the second focus point are located substantially at the same point. It is further preferred that the first radius and the second radius differ so that the region has a radial width.

The first approximately circular arc is further definable by a first starting angle and either a first ending angle or a first arc angle. The second approximately circular arc is further definable by a second starting angle and either a second ending angle or a second arc angle. Preferably, the first arc angle and/or the second arc angle are non-zero so that the region has an angular width. Also preferably, the first starting angle is substantially the same as the second starting angle, the first ending angle is substantially the same as the second ending angle, and the first arc angle is substantially the same as the second arc angle.

The first line segment and the second line segment are preferably oriented substantially radially with respect to a point. Preferably, this point is located substantially at the first focus point and the second focus point. In this case, it is also preferred that the first line segment be oriented substantially radially with respect to the point at an angle substantially the same as the first starting angle and the second starting angle, and that the second line segment be oriented substantially radially with respect to the point at an angle substantially the same as the first ending angle and the second ending angle.

The root element may be represented by a substantially convex shape. Preferably, the substantially convex shape is at least partially defined by at least a portion of an approximate circle. Examples of the substantially convex shape having this preferred form include, but are not limited to, an approximate sector of a circle, and approximately an entire circle.

It is noted that use of the terms "approximate" and "approximately" for the herein-disclosed regions, shapes, and curves include non-perfect representations of said regions, shapes, and curves using a display device and/or an input device. For example, a pixel-based display device can display a plurality of discrete pixels to approximate any of the herein-disclosed regions, shapes, and curves. As another example, a display device may distort an intended region, shape, or curve to produce an approximation thereof. Examples of this distortion include, but are not limited to, a distortion due to pixel aspect ratio, a distortion due to a non-planar display screen, and a distortion due to rasterization.

Still further, use of the terms "approximate" and "approximately" for the herein-disclosed regions, shapes, and curves include representations of said regions, shapes, and curves having corners that are rounded or otherwise modified.

Approximations of regions, shapes, and curves may also be generated in software or firmware. For example, a curve may be represented by a piecewise approximation. An example of a piecewise approximation of a curve includes, but is not limited to, a piecewise linear approximation. Further examples include a curve being approximated by a simplified equation therefor, and a curve being approximated by a plurality of display points. Examples of ways to approximate a shape or a region include, but are not limited to, using a plurality of points to approximate the shape or region, and using a polygon to approximate the shape or region.

Use of discrete parameter values to represent a region, shape, or curve also may result in an approximation thereof. For example, a circular arc may be represented by an integral center coordinate, an integral radius, an integral start angle, and an integral arc width. In this case, and other cases, either round-off or truncation of parameter values to comply with a discrete representation results in an approximation of a desired region, shape, or curve.

It is noted that a shape need not be precisely convex to be substantially convex. Examples of insubstantial concavities in a substantially convex shape include, but are not limited to, those which may result from an approximation of the shape or a curve which at least partially defines the shape, and those present where endpoints of two curves imprecisely meet.

FIG. 1 is a flow chart of an embodiment of a method of determining regions to represent tree-related elements. Each element is represented by a corresponding node of a tree. For each non-root node in the tree (as indicated by block 10), a first value associated with the node is determined (as indicated by block 12). The first value is based on (W+C1)/C2, wherein W denotes a weight of the node, C1 denotes a cumulative weight of all descendants of the node, and C2 denotes a cumulative weight of all descendants of a parent of the node.

For each non-root node in the tree (as indicated by block 14), a second value associated with the node is determined (as indicated by block 16). The second value is equal to a product of the first values for all non-root nodes in a tree-defined path from the root node to the node.

As indicated by block 20, the method comprises determining angles to define the regions based on the second values. The angles may be based on an overall angular width of an aggregation of the regions, herein denoted by MAXIMUM_ARC_ANGLE, and an initial starting angle of the aggregation of the regions, herein denoted by FIRST_START_ANGLE. In general, the MAXIMUM_ARC_ANGLE value can be any value, such as less than 180 degrees, about equal to 180 degrees, greater than 180 degrees but less than 360 degrees, or about equal to 360 degrees. If the MAXIMUM_ARC_ANGLE is equal to 360 degrees, the region representing the root node is a circle. If the MAXIMUM_ARC_ANGLE is less than 360 degrees, the region representing the root node is a sector of a circle having a start angle and an end angle.

The start angle for the root node is set to the FIRST_START_ANGLE value. The end angle for the root node is set to a sum of the FIRST_START_ANGLE value and the MAXIMUM_ARC_ANGLE value. A resulting arc angle for the root node is equal to the MAXIMUM_ARC_ANGLE value.

Figure 2:
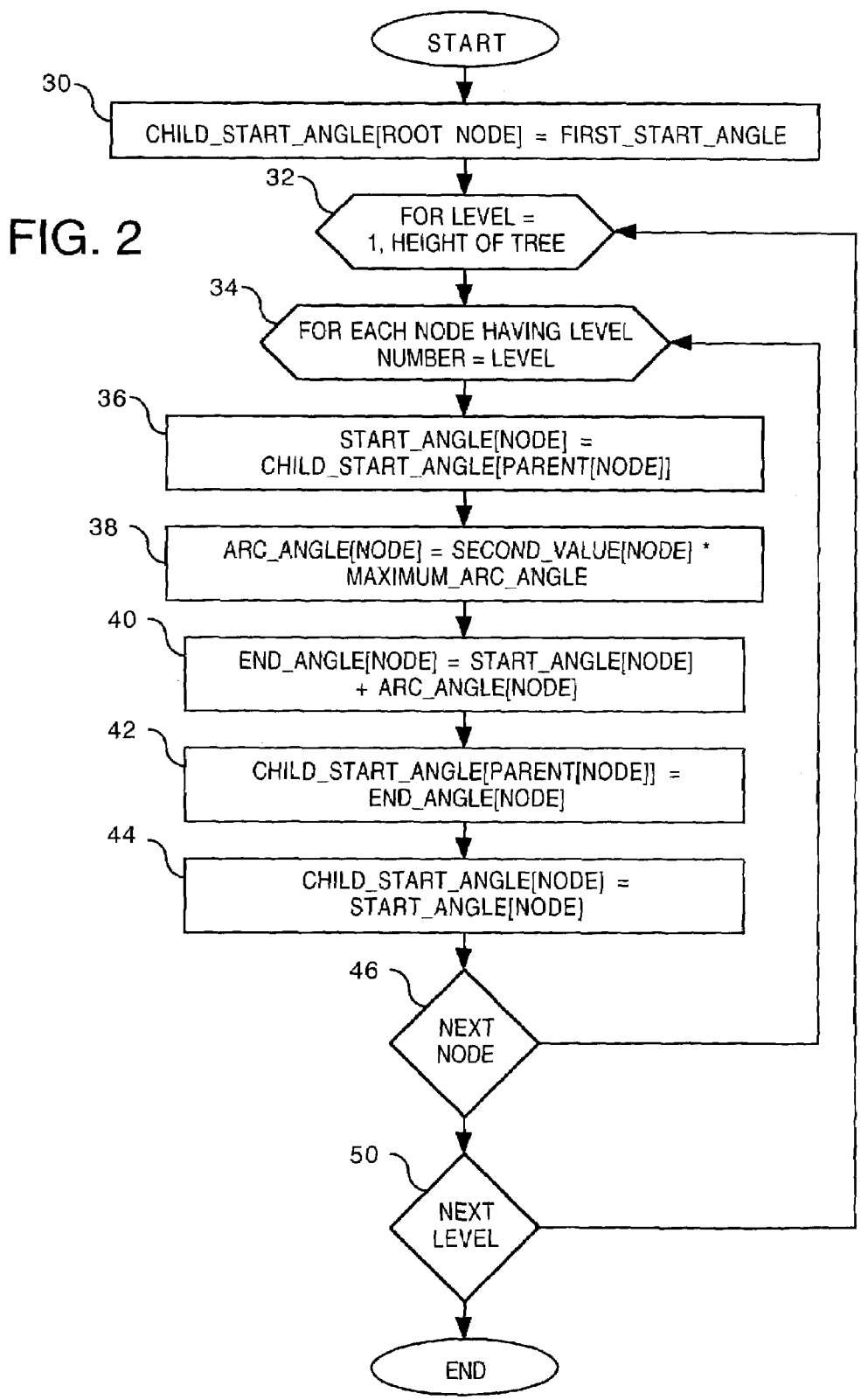
FIG. 2 is a flow chart of an embodiment of a method of determining angles to define the regions.

An embodiment of a method of determining angles associated with non-root nodes is shown in FIG. 2. As indicated by block 30, the method comprises initializing a variable, herein denoted by CHILD_START_ANGLE, of the root node. The CHILD_START_ANGLE of the root node is initialized to be equal to FIRST_START_ANGLE. As indicated by block 32, a variable denoted as LEVEL is prepared to increment from 1 to a height of the tree. As indicated by block 34, the method comprises performing acts for each node having a level number equal to the LEVEL variable. The acts comprise determining a start angle for the node (block 36), an arc angle for the node (block 38), and an end angle for the node (block 40). The start angle is equal to the CHILD_START_ANGLE value of the parent of the node. The arc angle is equal to a product of the second value of the node and the MAXIMUM_ARC_ANGLE value. The end angle is equal to a sum of the start angle and the arc angle. Alternatively, the end angle may be equal to the start angle minus the arc angle.

The acts further comprise updating the CHILD_START_ANGLE of the parent of the node (block 42), and setting the CHILD_START_ANGLE of the node (block 44). The CHILD_START_ANGLE of the parent of the node is updated to be equal to the end angle for the node. The CHILD_START_ANGLE of the node is set to the start angle for the node. Optionally, the act in block 44 is omitted if the node is a leaf node.

As indicated by block 46, flow of the method is directed back to block 34 if there is a further node having a level number equal to the LEVEL variable. Otherwise, flow of the method is directed to block 50. From block 50, if there is a further level to process, flow of the method is directed to block 32 wherein the LEVEL variable is incremented. If there are no further levels to process, the method is completed.

Referring back to FIG. 1, an act of determining radii to define the regions is performed as indicated by block 52. Preferably, the region representing the root node is definable by a single radius. Thus, if the MAXIMUM_ARC_ANGLE is equal to 360 degrees, the region representing the root node may be a circle; and if the MAXIMUM_ARC_ANGLE is less than 360 degrees, the region representing the root node may be a sector of a circle.

Figure 3:
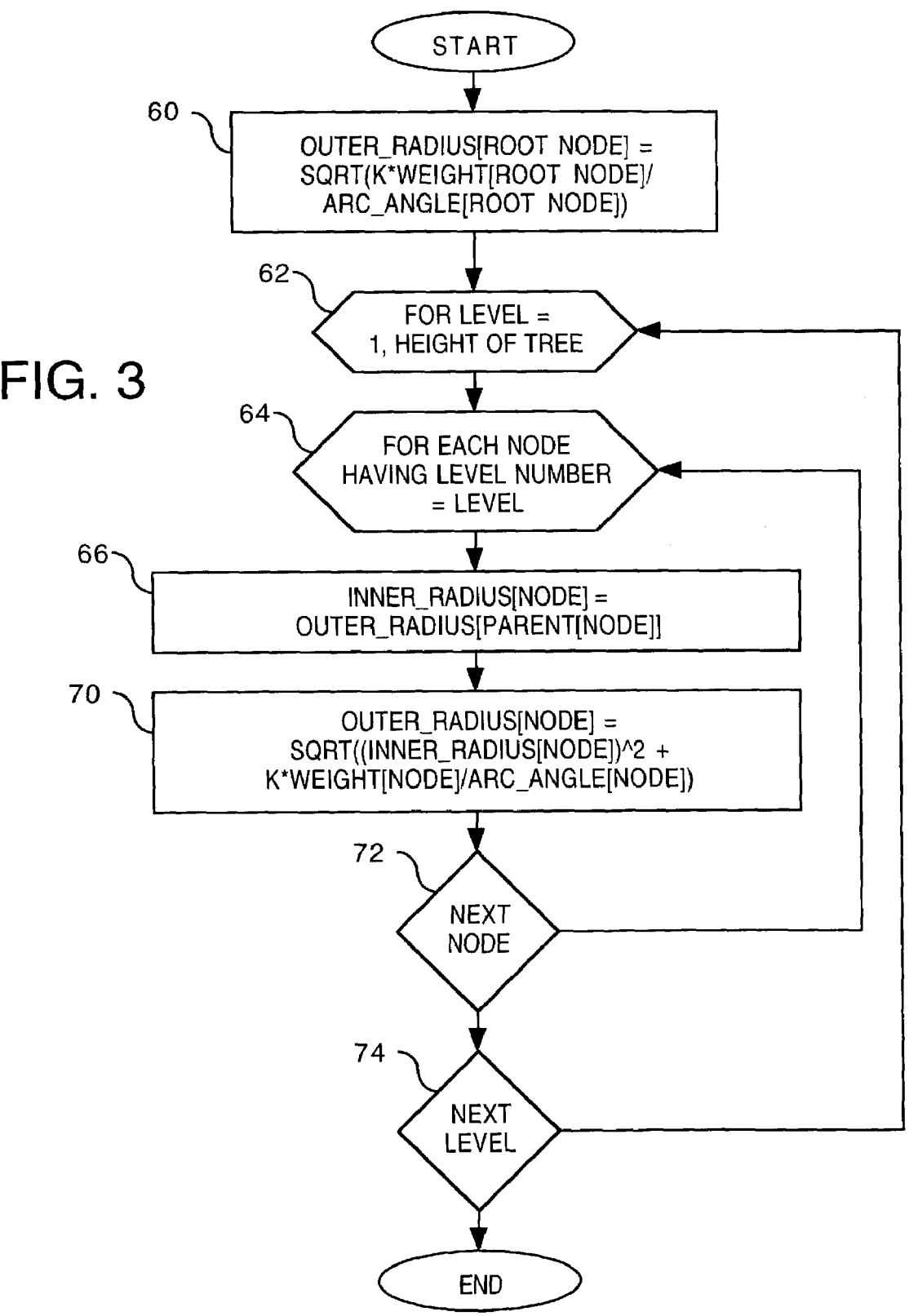
FIG. 3 is a flow chart of an embodiment of a method of determining radii to define the regions.

FIG. 3 is a flow chart of an embodiment of a method of determining radii to define the regions. The radii may be based on an overall radius of the aggregate of the regions, herein denoted by MAXIMUM_RADIUS. To simplify subsequent computations, a constant K defined as the MAXIMUM_ARC_ANGLE times the square of the MAXIMUM_RADIUS, divided by the cumulative weight of all nodes in the tree, is determined.

K MAXIMUM_ARC_ANGLE*(MAXIMUM_RADIUS)$^2$/

(cumulative weight of all nodes in the tree)

As indicated by block 60, an outer radius for the root node is determined. The outer radius for the root node is equal to the square root of: K times the weight of the root node divided by the arc angle for the root node.

As indicated by block 62, a variable denoted as LEVEL is prepared to increment from 1 to a height of the tree. As indicated by block 64, the method comprises performing acts for each node having a level number equal to the LEVEL variable. The acts comprise determining an inner radius for the node (block 66) and an outer radius for the node (block 70). The inner radius for the node is determined to be equal to the outer radius for the parent of the node. The outer radius for the node is equal to the square root of: the sum of square of the inner radius of the node and K times the weight of the node divided by the arc angle for the node. Optionally, if the node is a leaf node, the outer radius of the node can be determined to be equal to the MAXIMUM_RADIUS value without performing the aforementioned computation.

As indicated by block 72, flow of the method is directed back to block 64 if there is a further node having a level number equal to the LEVEL variable. Otherwise, flow of the method is directed to block 74. From block 74, if there is a further level to process, flow of the method is directed to block 62 wherein the LEVEL variable is incremented. If there are no further levels to process, the method is completed.

Referring back to FIG. 1, an act of providing the regions to represent the nodes in the tree is performed, as indicated by block 80. Each non-root node is represented by a corresponding region definable with respect to a common focus point by the start angle, end angle, inner radius, and outer radius. The root node is represented by a region definable with respect to the common focus point by an outer radius, and optionally a start angle and an end angle.

The resulting aggregation of regions has many desirable qualities. For any tree configuration, the herein-disclosed method provides a one-to-one correspondence between the nodes and the regions. By one-to-one correspondence, it is meant that each node is represented by one and only one of the regions, and each of the regions represents one and only one of the nodes.

Further, the aggregation of regions is contiguous for any tree configuration, which in the context of this disclosure is broadly inclusive of describing the regions as being either neighboring or adjacent throughout the aggregation. For example, adjacent pairs of regions which are spaced slightly apart are considered to be contiguous.

Still further, the aggregation of regions defines an identifiable boundary at its periphery for any tree configuration. If the MAXIMUM_ARC_ANGLE value is 360 degrees, the boundary comprises a circle having a radius equal to the MAXIMUM_RADIUS value. If the MAXIMUM_ARC_ANGLE value is less than 360 degrees, the boundary comprises an arc having a radius equal to the MAXIMUM_RADIUS value, a start angle equal to the FIRST_START_ANGLE value, and an arc angle equal to the MAXIMUM_ARC_ANGLE value.

Yet still further, for any tree configuration, the herein-disclosed method provides a one-to-one correspondence between leaf nodes and regions adjacent the circle or arc boundary. By one-to-one correspondence, it is meant that all the leaf nodes are represented by regions adjacent the circle or arc boundary, and all regions adjacent the circle or arc boundary represent leaf nodes. Thus, a user can easily identify the leaf nodes of the tree even if the branches of the tree have different lengths.

Also, for any tree configuration, the area of each region is proportional to the weight of its corresponding node. If the nodes are either equally weighted or unweighted, each of the regions has the same area for any tree configuration.

It is noted that there are various scenarios in which regions having areas strictly unproportional to their weights have areas substantially proportional to their weights. Examples of sources of deviation in areas which still provide substantially proportional areas, but are not limited to, approximations used to display the regions (see the discussion herein of "approximate" and "approximately"), approximations in the mathematical processes used to calculate the areas and/or the parameters which define the regions, and round-off and/or truncation errors in the mathematical processes used to calculate the areas and/or the parameters which define the regions.

It is noted that any values or parameters which are herein-described as being the same or equal can be slightly different, i.e. either about or approximately the same, either about or approximately equal. In a particular example, the inner radius of one or more nodes (determined in block 66 in FIG. 3) can be modified to be slightly greater than the outer radius of its parent to mitigate a possibility of radially-overlapping regions. Another way to mitigate radially-overlapping regions comprises modifying the outer radius of one or more nodes to be slightly less than the inner radius of each of its children. In either of the above two examples, the inner radius and the outer radius are still considered to be about equal. Similarly, the start angle and/or end angle of each region can be compressed toward the center of its region to mitigate a possibility of angularly-overlapping regions. In this case, angles of angularly adjacent regions are still considered to be about equal. In any of the above examples, the resulting area of the region is still considered to be about monotonically-related and/or about proportional to the weight of its corresponding node.

Figure 4:
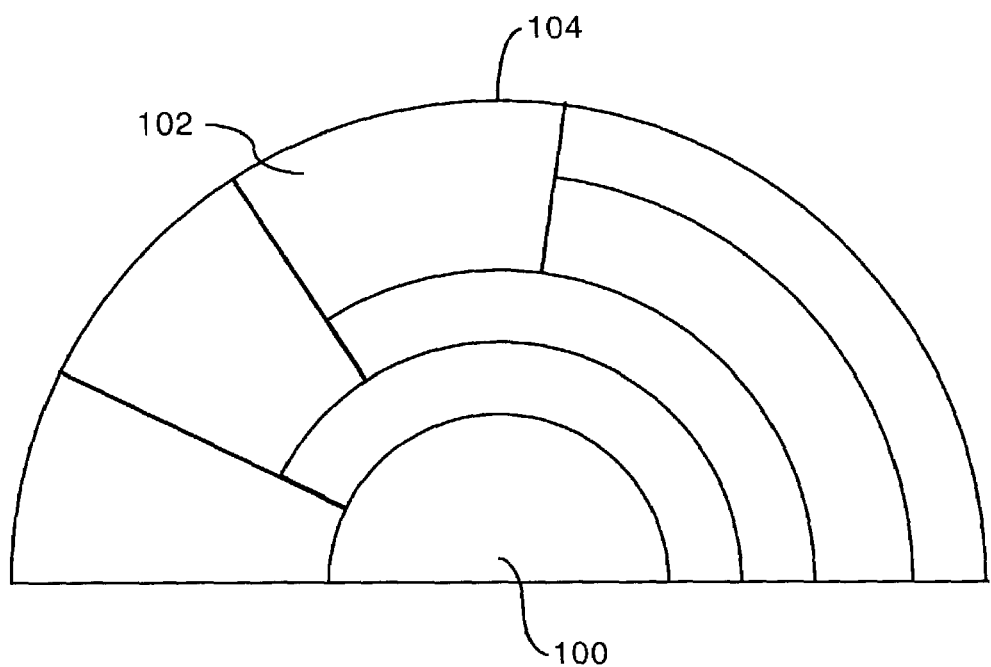
FIG. 4 shows an example of regions which represent tree-related elements.

An example of regions which represent equally-weighted tree-related elements is shown in FIG. 4. A semicircular region 100 represents a root node of a tree. Circular annulus sectors, a representative one indicated by reference numeral 102, represent non-root nodes of the tree. All of the leaf nodes are represented by regions adjacent a semicircular arc 104 which partially defines a periphery of the aggregation of the regions. The regions are approximated by rounding the start angle and the end angle to an integral number of degrees, and rounding the outer radius to an integral number of display units. All of the regions have approximately the same area.

The act of providing the regions may comprise outputting a signal to display the regions and/or outputting a signal to make the regions user-selectable, to provide a user interface. The at least one signal to provide the user interface may be communicated by a computer data signal. The computer data signal may be communicated via a computer network. Examples of the computer network include, but are not limited to, an intranet, an internet and an extranet. The computer data signal may include computer program code to assist in providing the user interface. Of particular interest are signals representative of code in a markup language such as HTML (hypertext markup language).

The user-selectable regions can be provided in a variety of ways. Of particular interest is use of either a client-side image map or a server-side image map to provide the user-selectable regions in relation to an image of the regions. Here, a user-selectable region can be provided using HTML tags to approximate any of the herein-disclosed shapes, including convex shapes such as sectors and concave shapes such as annular sectors. In particular, the polygon area definition in an AREA tag inside a MAP tag can be used to provide a user-selectable region having one of the herein-disclosed shapes.

It is noted that a markup language improvement is contemplated which would provide an annular sector area definition and a sector area definition in an AREA tag inside a MAP tag. For example, a sector of a circle could be definable by an AREA tag having the following form:

<AREA SHAPE="circle_sector" COORDS="x,y,x1,y1,x2,y2,x3,y3" HREF="URL"> where (x,y) are coordinates of a center point of an arc-defining circle, (x1,y1) are coordinates of a point either on or collinear with a first radial line segment, (x2,y2) are coordinates of a point either on or collinear with a second radial line segment, (x3,y3) are coordinates of a point either on or co-circular with the circular arc, and URL is a computer address such as a uniform resource locator which is linked to in response to a user selection of the region. It is noted that the HREF="URL" portion can replaced by one or more event codes (e.g. onclick, ondblclick, onmousedown, onmousemove, onmouseover, onmouseout, onmouseup) each followed by an associated function.

A sector of a circular annulus could be definable by an AREA tag having the following form:

<AREA SHAPE="annulus_sector" COORDS="x,y,x1,y1,x2,y2,x3,y3,x4,y4" HREF="URL"> where (x,y) are coordinates of a center point of a first arc-defining circle and a second arc-defining circle, (x1,y1) are coordinates of a point either on or collinear with a first radial line segment, (x2,y2) are coordinates of a point either on or collinear with a second radial line segment, (x3,y3) are coordinates of a point either on or co-circular with the first circular arc, (x4,y4) are coordinates of a point either on or co-circular with the second circular arc, and URL is a computer address such as a uniform resource locator which is linked to in response to a user selection of the region. It is noted that the HREF="URL" portion can replaced by one or more event codes (e.g. onclick, ondblclick, onmousedown, onmousemove, onmouseover, onmouseout, onmouseup) each followed by an associated function.

With this improvement, a user interface creator can more directly implement user-selectable regions having some of the herein-disclosed shapes.

The at least one signal is communicated by a waveform representative thereof through a communication medium. Examples of the waveform and the communication medium include, but are not limited to, an optical waveform through an optical medium, an electronic waveform through an electronic medium, and an electromagnetic waveform through an electromagnetic medium.

Based on the at least one signal, the regions may be displayed by a display device. Examples of the display device include, but are not limited to, a computer monitor, a television, a liquid crystal display, a cathode ray tube, and a gas plasma display. For a computer data signal, the at least one signal is received by a computer in communication with the computer network. The computer generates a display signal to display the region on the display device.

An apparatus for performing an embodiment of the herein-disclosed methods and examples may comprise one or more programmed computers. Each programmed computer may provide a particular functionality implemented using hardware and/or software and/or firmware.

Preferably, a programmed computer includes a computer memory encoded with executable instructions representing a computer program. A processor is responsive to the computer memory to perform a series of specifically identified operations dictated by the computer program. In this way, the computer program can cause the computer to act in a particular fashion.

Examples of the processor include, but are not limited to, a general purpose microprocessor, an application-specific integrated circuit (which may be either standard or custom), one or more discrete logic elements, a digital signal processor, an analog signal processor, one or more circuits, or any combination thereof. It is noted that the processor may be embodied by either a single processing unit or a plurality of processing units. For example, the processor may be embodied by either a single, central processing unit or a plurality of distributed processing units.

Examples of the computer memory include, but are not limited to, an electronic memory, a magnetic memory, an optical memory, and a magneto-optical memory. Examples of an electronic memory include, but are not limited to, a programmable electronic memory and a read-only, hard-wired electronic memory. Examples of a magnetic memory include, but are not limited to, a magnetic disk and a magnetic tape. The magnetic disk may be embodied by a magnetic floppy diskette or a magnetic hard drive, for example. Examples of an optical memory include, but are not limited to, an optical disk. The optical disk may be embodied by a compact disk or a DVD, for example. Regardless of its form, the computer memory may be either read-only, once-writable, or rewritable.

In general, the processor may be responsive to any data structures, computer programs, and signals encoded on a computer-readable medium to perform an embodiment of any of the herein-disclosed methods and examples. Examples of the computer-readable medium include, but are not limited to, computer-readable storage media and computer-readable communication media. Examples of computer-readable storage media are described with reference to the computer memory.

The computer is coupled to a display to display the visible representations described herein and other visible information to an end user. Examples of the display include any of the herein-disclosed display devices.

The computer receives user input indicating a selection of a region from one or more input devices. Examples of the one or more input devices include, but are not limited to, a keyboard, a touch screen, a touch pad, a voice input device, and a pointing device (e.g. a mouse or a pointing stick). The computer processes the user input and/or communicates at least one signal based upon the user input. The display and the one or more input devices facilitate user interaction with the computer.

Embodiments of the herein-disclosed methods and examples can be performed using either a single computer or a plurality of computers. A plurality of computers may cooperate in a client-server fashion, for example, wherein a server computer outputs at least one signal to cause a client computer to display a visible representation and/or to provide a user interface. The plurality of computers may cooperate in a peer-to-peer fashion, for example, wherein one peer computer acts as a server computer and another peer computer acts as a client computer.

The teachings herein can be combined with and/or applied to any of the teachings in U.S. application Ser. No. 09/243,595, now U.S. Pat. No. 6,359,635, which is hereby incorporated by reference in this application.

It will be apparent to those skilled in the art that the disclosed inventions may be modified in numerous ways and may assume many embodiments other than the preferred forms specifically set out and described herein. For example, the acts described with reference to FIGS. 1 to 3 may be executed in an order other than that indicated in FIGS. 1 to 3. Further, some of the acts may be performed in parallel.

Still further, the regions to represent the nodes may have shapes other than circular annulus sectors. Examples of the shapes include, but are not limited to, circles, ellipses, rectangles, squares, triangles, polygons. Each region may be fully contained within the circular annulus sector of its associated non-root node. The regions can be positioned based on any of the herein-disclosed angles and radii associated with the nodes. Each region representing a non-root node may be centered or otherwise positioned at a polar coordinate location from the common focus point. The polar coordinate location of each region comprises a radius based on the inner radius and/or outer radius of its associated node as described with reference to FIG. 3, and an angle based on at least one of the start angle, end angle and arc angle of its associated node as described with reference to FIG. 2. Examples of the radius of the polar coordinate location include, but are not limited to, the inner radius, the outer radius, and halfway between the inner radius and the outer radius. Examples of the angle of the polar coordinate location include, but are not limited to, the start angle, the end angle, and halfway between the start angle and the end angle.

Optionally, a visible line segment or another visible curve may be provided between each pair of regions representing adjacent nodes in the tree. Thus, a first region representing a node would be connected to a second region representing its parent node by a visible line segment or another visible curve.

Accordingly, it is intended by the appended claims to cover all modifications which fall within the true spirit and scope of the present invention.

What is claimed is:

1. A method of representing a particular non-root node of a tree having a root node and a plurality of non-root nodes, the method comprising:
   determining a corresponding value for each non-root node in a tree-defined path between the root node and the particular non-root node based on a weight W of the corresponding non-root node, a cumulative weight C1 of all descendants of the corresponding non-root node, and a cumulative weight C2 of all descendants of a parent of the corresponding non-root node;
   determining a product of all values corresponding to non-root nodes in the tree-defined path between the root node and the particular non-root node; and
   providing a region to represent the particular non-root node, the region having an angular width and a radial width each based on the product.

2. The method of claim 1 wherein the weight of the particular non-root node differs from the weight of at least another one of the non-root nodes, wherein each value is based on (W+C1)/C2 for its corresponding non-root node, wherein the region is approximately shaped as a sector of a circular annulus having an inner radius and an outer radius which define the radial width, wherein the outer radius is based on the inner radius, the weight of the particular non-root node, and the angular width.

3. The method of claim 1 wherein the weight of the particular non-root node differs from the weight of at least another one of the non-root nodes.

4. The method of claim 1 wherein each value is based on (W+C1)/C2 for its corresponding non-root node.

5. The method of claim 1 wherein the region is approximately shaped as a sector of a circular annulus.

6. The method of claim 1 wherein the region has an inner radius and an outer radius which define the radial width, and wherein the outer radius is based on the inner radius, the weight of the particular non-root node, and the angular width.

7. The method of claim 1 wherein the weight of each non-root node is equal to one.

8. The method of claim 1 wherein the region is associated with a purchasable item.

9. The method of claim 1 wherein the region is user-selectable.

10. The method of claim 1 wherein said providing the region comprises outputting a signal to display the region.

11. The method of claim 1 wherein said providing the region comprises producing a hard copy representation of the region.

12. A method of representing a particular non-root node of a tree having a root node and a plurality of non-root nodes, the method comprising:

determining a corresponding value for each non-root node in a tree-defined path between the root node and the particular non-root node based on a weight W of the corresponding non-root node, a cumulative weight C1 of all descendants of the corresponding non-root node, and a cumulative weight C2 of all descendants of a parent of the corresponding non-root node, wherein the weight of the particular non-root node differs from the weight of at least another one of the non-root nodes;

determining a product of all values corresponding to non-root nodes in the tree-defined path between the root node and the particular non-root node; and providing a region to represent the particular non-root node, the region having an angular width based on the product.

13. The method of claim 12 wherein each value is based on (W+C1)/C2 for its corresponding non-root node.

14. The method of claim 12 wherein the region is approximately shaped as a sector of a circular annulus.

15. The method of claim 12 wherein the region is user-selectable.

16. The method of claim 12 wherein said providing the region comprises outputting a signal to display the region.

17. The method of claim 12 wherein said providing the region comprises producing a hard copy representation of the region.

18. A method of representing a tree having a root node and a plurality of non-root nodes, the method comprising:

determining a corresponding first value for each non-root node based on a weight W of the non-root node, a cumulative weight C1 of all descendants of the non-root node, and a cumulative weight C2 of all descendants of a parent of the non-root node, wherein each first value is based on (W+C1)/C2 for its corresponding non-root node;

determining a corresponding second value for each non-root node, each second value based on a product of all first values corresponding to non-root nodes in a tree-defined path between the root node and its corresponding non-root node;

for each non-root node, determining a corresponding angular width based on its corresponding second value;

determining an outer radius for the root node;

for each value of a level variable from one to a height of the tree:

for each node having a level number equal to the level variable:

determining an inner radius for the node based on the outer radius of a parent of the node; and determining an outer radius for the node, wherein the outer radius for at least one node is based on the inner radius for the node, the weight of the node, and the angular width for the node; and providing a plurality of regions to represent the non-root nodes, wherein each region is defined by the angular width, the inner radius, and the outer radius for its corresponding non-root node.

19. The method of claim 18 wherein the weights of at least two of the non-root nodes differ from each other.

20. The method of claim 18 wherein each of the regions to represent the non-root nodes is approximately shaped as a sector of a circular annulus.

* * * * *